United States Patent
Yang et al.

(10) Patent No.: US 11,772,729 B1
(45) Date of Patent: Oct. 3, 2023

(54) ELECTRIC BICYCLE PARKING PILE AND PARKING LOCK STRUCTURE THEREOF

(71) Applicant: HUNAN XIBAODA INFORMATION TECHNOLOGY CO., LTD, Changsha (CN)

(72) Inventors: Feng Yang, Changsha (CN); Xiaosong Xue, Changsha (CN)

(73) Assignee: HUNAN XIBAODA INFORMATION TECHNOLOGY CO., LTD, Changsha (CN)

( * ) Notice: Subject to any disclaimer, the term of this patent is extended or adjusted under 35 U.S.C. 154(b) by 0 days.

(21) Appl. No.: 18/334,051

(22) Filed: Jun. 13, 2023

Related U.S. Application Data (63) Continuation of application No. PCT/CN2022/109025, filed on Jul. 29, 2022.

(30) Foreign Application Priority Data

Aug. 2, 2021 (CN) .......................... 202110881526.5

(51) Int. Cl.
*B62H 3/10* (2006.01)
*B62H 5/06* (2006.01)

(52) U.S. Cl.
CPC ................ *B62H 3/10* (2013.01); *B62H 5/06* (2013.01); *B62H 2700/005* (2013.01)

(58) Field of Classification Search
CPC ...... B62H 5/06; B62H 2700/005; B62H 3/00; B62H 3/02; B62H 3/04; B62H 3/08; B62H 3/10
See application file for complete search history.

(56) References Cited

U.S. PATENT DOCUMENTS

| | | | | | |
|---|---|---|---|---|---|
| 4,055,060 | A | * | 10/1977 | Bellino | B62H 5/003 70/238 |
| 7,726,160 | B2 | * | 6/2010 | Gagosz | B62H 3/00 70/389 |
| 8,061,499 | B2 | * | 11/2011 | Khairallah | B62H 3/04 340/432 |
| 8,678,205 | B2 | * | 3/2014 | Mercat | B62M 6/40 211/5 |

(Continued)

FOREIGN PATENT DOCUMENTS

| CN | 2263043 Y | 9/1997 |
|---|---|---|
| CN | 105882794 A | 8/2016 |

(Continued)

*Primary Examiner* — Patrick D Hawn
(74) *Attorney, Agent, or Firm* — Nitin Kaushik (57) ABSTRACT

Disclosed are an electric bicycle parking pile and a parking lock structure thereof, including a mounting base, a movable rod and at least one lock rod extending outward along the width of the mounting base. The mounting base includes a first base plate and two first side plates extending upward from two opposite sides of the first base plate. The middle of each first side plate includes a chute extending along the height. A first reset spring on the outer surfaces of the first guide post and the second guide post can enlarge the adjustment range of the lock rod and the application range of the parking lock, and make the lock rod automatically return to the initial position. The lock lever includes a locking groove. There is a preset angle of inclination between the axis of the lock lever and the first base plate.

6 Claims, 7 Drawing Sheets

(56) References Cited

U.S. PATENT DOCUMENTS

| | | | | |
|---|---|---|---|---|
| 9,169,673 B2* | 10/2015 | Chen | ................. | E05B 47/0001 |
| 10,641,014 B2* | 5/2020 | Tepper | ................. | G07C 9/33 |
| 10,913,504 B2* | 2/2021 | Wu | ................. | E05B 47/0001 |
| 11,091,214 B2* | 8/2021 | Bettez | ................. | B62H 3/04 |
| 11,214,322 B2* | 1/2022 | Askin | ................. | B62J 6/015 |
| 11,400,989 B2* | 8/2022 | Sørensen | ................. | B62H 5/20 |
| 2008/0094192 A1* | 4/2008 | Dutt | ................. | B62H 3/12 |
| | | | | 340/427 |
| 2009/0178446 A1* | 7/2009 | Patterson | ................. | B62H 5/144 |
| | | | | 70/259 |
| 2013/0255336 A1* | 10/2013 | Desai | ................. | B62H 3/04 |
| | | | | 70/431 |
| 2014/0265237 A1* | 9/2014 | Strother | ................. | B62H 3/00 |
| | | | | 280/297 |

FOREIGN PATENT DOCUMENTS

| | | | |
|---|---|---|---|
| CN | 206437104 U | | 8/2017 |
| CN | 206938919 U | | 1/2018 |
| CN | 212797154 U | | 3/2021 |
| DE | 202010007358 U1 | * | 9/2010 |
| KR | 102193275 B1 | * | 12/2020 |
| WO | WO-2014068125 A2 | * | 5/2014 |
| WO | WO-2019161560 A1 | * | 8/2019 |

* cited by examiner

ELECTRIC BICYCLE PARKING PILE AND PARKING LOCK STRUCTURE THEREOF

CROSS-REFERENCE TO RELATED APPLICATIONS

This application is a national stage application of PCT international application No. PCT/CN2022/109025 filed on Jul. 29, 2022, which claims priority to Chinese patent application No. 202110881526.5, entitled "ELECTRIC BICYCLE PARKING PILE AND PARKING LOCK STRUCTURE THEREOF", filed on Aug. 2, 2021, the entire content of which is incorporated herein by reference.

TECHNICAL FIELD

The present disclosure relates to the technical field of electric bicycles, and in particular, to an electric bicycle parking pile and a parking lock structure thereof.

BACKGROUND

With the progress of society, people's awareness of green travel has gradually increased, and shared electric bicycles have emerged as the times require. Electric bicycle travel is light, convenient, easy and cheap, and has become an important part of traffic modes.

Upon the popularity of shared electric bicycles, the number of electric bicycles increases sharply, and the locking safety, convenience and intelligence of electric bicycles are increasingly concerned.

SUMMARY

The present disclosure provides a parking lock structure for electric bicycle parking pile. The parking lock structure includes a mounting base, a movable rod and at least one lock rod extending outward along the width of the mounting base.

The mounting base includes a first base plate and two first side plates extending upward from two opposite sides of the first base plate. The two first side plates are arranged along the width of the first base plate. The middle of each first side plate is provided with a chute extending along the height. The movable rod is transversely arranged above the first base plate. Both ends of the movable rod respectively pass through the chute to limit its reciprocating movement along the height of the chute.

At least one first guide post is protruded upward on the top surface of the first base plate, and a second guide post corresponding to the first guide post is protruded downward on the outer surface of the movable rod. A preset spacing distance is reserved between the top surface of the first guide post and the bottom surface of the second guide post. There is a first reset spring on the outer surfaces of the first guide post and the second guide post. The first reset spring is held between the first base plate and the movable rod.

The lock rod includes a dead lever and a lock lever opposite each other. The dead lever is fixedly connected with the movable rod, and a locking groove is arranged on the lock lever. There is a preset angle of inclination between the axis of lock lever and the first base plate.

In some embodiments, the number of the lock rod, the first guide post and the second guide post is two. The two lock rods, two first guide posts and two second guide posts are arranged at parallel intervals along the length of the movable rod.

In some embodiments, the lock lever of each lock rod is protruded outward with a leading end in the shape of circular truncated cone. The top diameter of the leading end is smaller than the bottom diameter.

In some embodiments, the preset angle of inclination is between 10° and 30°.

In some embodiments, the parking lock structure also includes a lock rod shroud assembly. The lock rod shroud assembly includes a third lock rod shroud, a second lock rod shroud used for covering the mounting base and a first lock rod shroud used for covering the lock rod. These lock rod shrouds are connected in sequence. The first lock rod shroud can slide along the inner wall of the second lock rod shroud. The top of the first lock rod shroud is provided with two lock holes for the lock rod to penetrate. The inner wall of the first lock rod shroud is protruded with a plurality of push rods facing the second lock rod shroud. An electric control device is installed in the cavity of the third lock rod shroud.

In some embodiments, the mounting base also includes a second side plate and a third side plate opposite each other. The second side plate is near the lock lever, and the third side plate is far away from the lock lever. The second side plate and the third side plate are both arranged along the length of the first base plate. The second side plate is provided with a plurality of first through holes arranged at intervals along the length of the first base plate. The third side plate is provided with a plurality of second through holes one-to-one corresponding to the first through holes. A fixed sleeve is installed between the first through hole and the second through hole, and a push part is connected with the free end of the push rod.

In some embodiments, the outer surface of the push rod is also equipped with a second reset spring. Both ends of the second reset spring are respectively abutted against the second side plate and the inner wall of the first lock rod shroud.

In some embodiments, the mounting base also includes a second base plate arranged side by side with the first base plate, and a travel switch assembly is arranged on the second base plate. Specifically, the travel switch assembly includes a travel switch body, and at least one travel switch which can swing around the travel switch body. The travel switch body is fixedly connected with the second base plate. The travel switch is set on the side of the second base plate far away from the push part. A first preset distance is spaced between the bottom surface of the travel switch and the second base plate, and a second preset distance is spaced between the travel switch and the second side plate. The first preset distance is less than the height of the push part, and the second preset distance is less than the difference between the length of the push rod and the length of the fixed sleeve.

In some embodiments, the parking lock structure also includes an L-shaped connecting base plate. The connecting base plate is provided with third through holes in a slender shape and is connected with the second base plate through the third through holes by screws.

The present disclosure also provides an electric bicycle parking pile, which includes a parking pile body and a parking lock structure as described above.

BRIEF DESCRIPTION OF DRAWINGS

To explain more clearly the embodiments of the present disclosure or the technical aspects of the prior art, the drawings required in the description of the embodiments or the prior art will be briefly described below. Obviously, the drawings described below are only some embodiments of the present disclosure. Other drawings may be obtained from the structure shown in these drawings shown here without any creative labor by those of ordinary skill in the art.

The purpose realization, functional features and advantages of the present disclosure will be further explained with reference to the figures in combination with embodiments.

DESCRIPTION OF SYMBOLS OF THE DRAWINGS

Parking lock 10; Parking pile 20;
Mounting base 100; First base plate 110; First side plate 120; Chute 121; First guide post 130; Second guide post 140; First reset spring 150; Second side plate 160; First through hole 161; Third side plate 170; Second through hole 171; Fixed sleeve 180; Second base plate 190;
Movable rod 200; Lock rod 300; Dead lever 310; Lock lever 320; Locking groove 330; Leading end 340; Lock rod shroud assembly 400; First lock rod shroud 410; Lock hole 411; Push rod 412; Push part 413; Second reset spring 414; Second lock rod shroud 420; Third lock rod shroud 430;
Travel switch assembly 500; Travel switch body 510; Travel switch 520; Connecting base plate 530; Third through hole 531.

DETAILED DESCRIPTION OF THE EMBODIMENTS

The specific embodiments described herein are intended only to explain the present disclosure and are not intended to define it.

A clear and complete description of the technical aspects in the embodiments of the present disclosure will be given below in conjunction with the drawings in the embodiments of the present disclosure. It is apparent that the embodiments described are only part of the embodiments of the present disclosure and not all embodiments. Based on embodiments of the present disclosure, all other embodiments obtained without creative labor by those of ordinary skill in the art fall within the scope of protection of the present disclosure.

It should be noted that all directivity indications (e.g., up, down, left, right, front, and back, etc.) in embodiments of the present disclosure are only used to explain the relative positional relationship and motion among the components in a specific posture (as shown in figures below). If the specific posture changes, the directivity indications will change accordingly.

In addition, the descriptions about "first", "second" and the like in the present disclosure are for descriptive purposes only and cannot be construed as indicating or implying their relative importance or implying the number of technical features indicated. Therefore, the features defined as "first" or "second" may explicitly or implicitly include at least one of the features. In addition, the technical solutions of each embodiment may be combined with each other, but must be on the basis that the person of ordinary skill in the art can realize it. When the combination of technical solutions conflicts or cannot be realized, it should be considered that such combination does not exist and is not within the scope of protection claimed by the present disclosure.

There are two main ways known to the inventors to lock electric bicycles: the self-provided locks of electric bicycles and fixed parking piles. Although the first way is flexible and convenient, there are often cases of electric bicycles being lost, stolen or parked carelessly, seriously affecting the appearance of the city. Although the cases of electric bicycles being lost, stolen or parked carelessly can be effectively solved by the second way, the lock bodies of existing parking piles generally adopt fixed structures. Such fixed structure cannot adapt to a variety of electric bicycles of different models and sizes, and have limited scope of application and low intelligence.

In view of this, it is necessary to propose an electric bicycle parking pile and a parking lock structure thereof to solve or at least alleviate the above defects.

Figure 1:
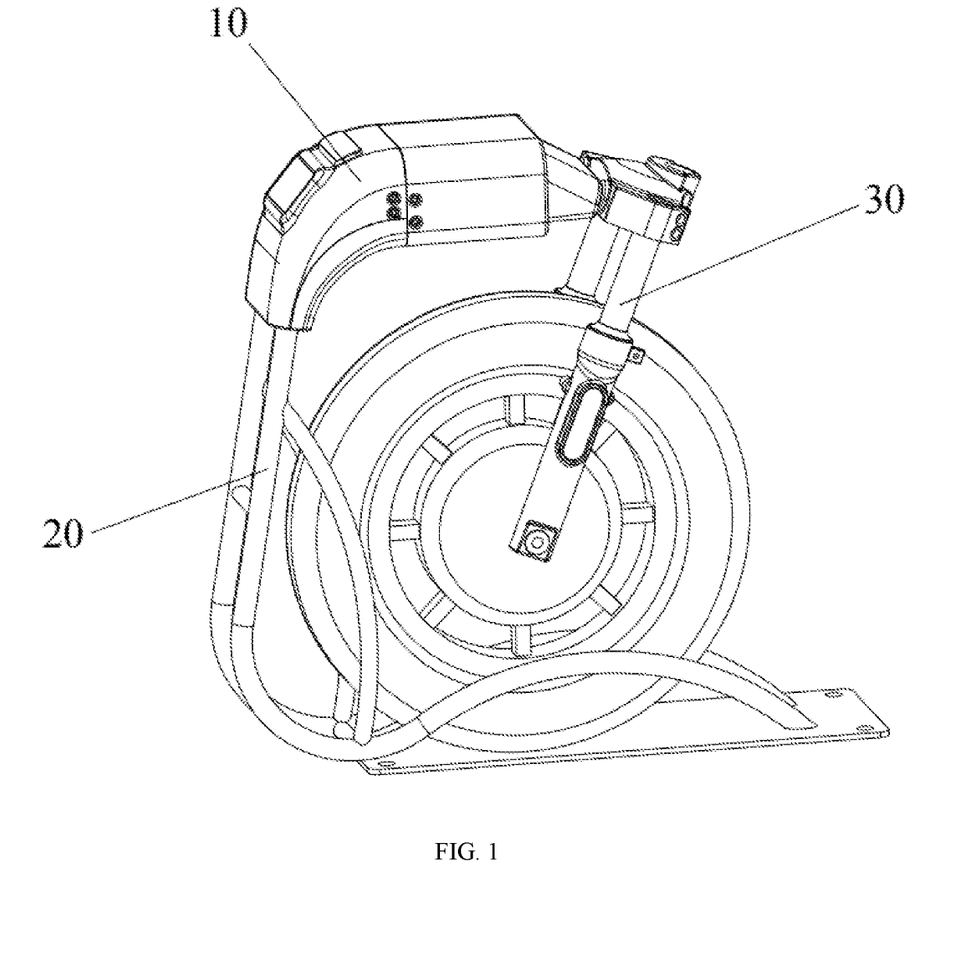
FIG. 1 is an application scenario diagram according to an embodiment of the present disclosure.
Figure 2:
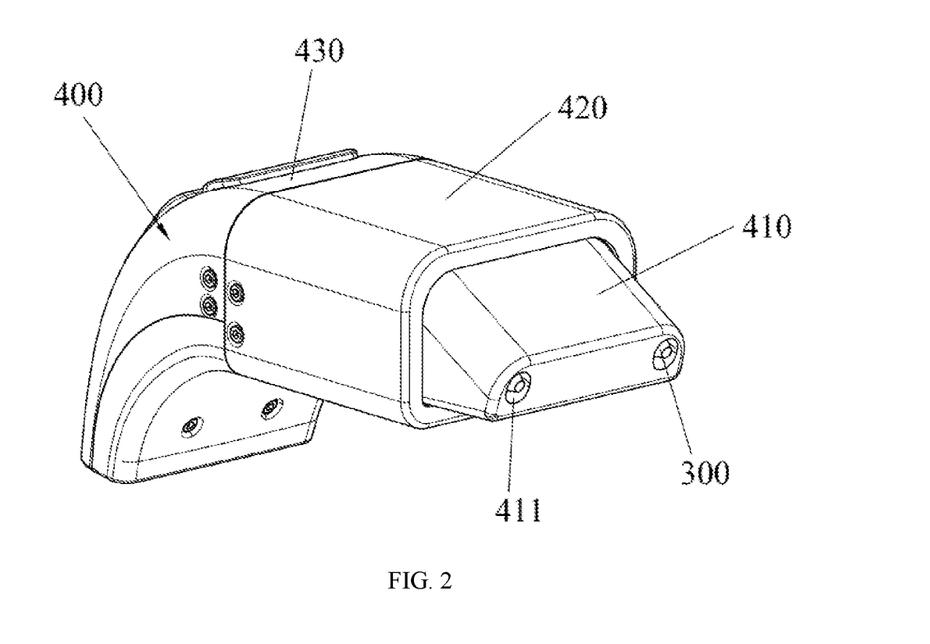
FIG. 2 is an overall structure diagram according to an embodiment of the present disclosure.
Figure 3:
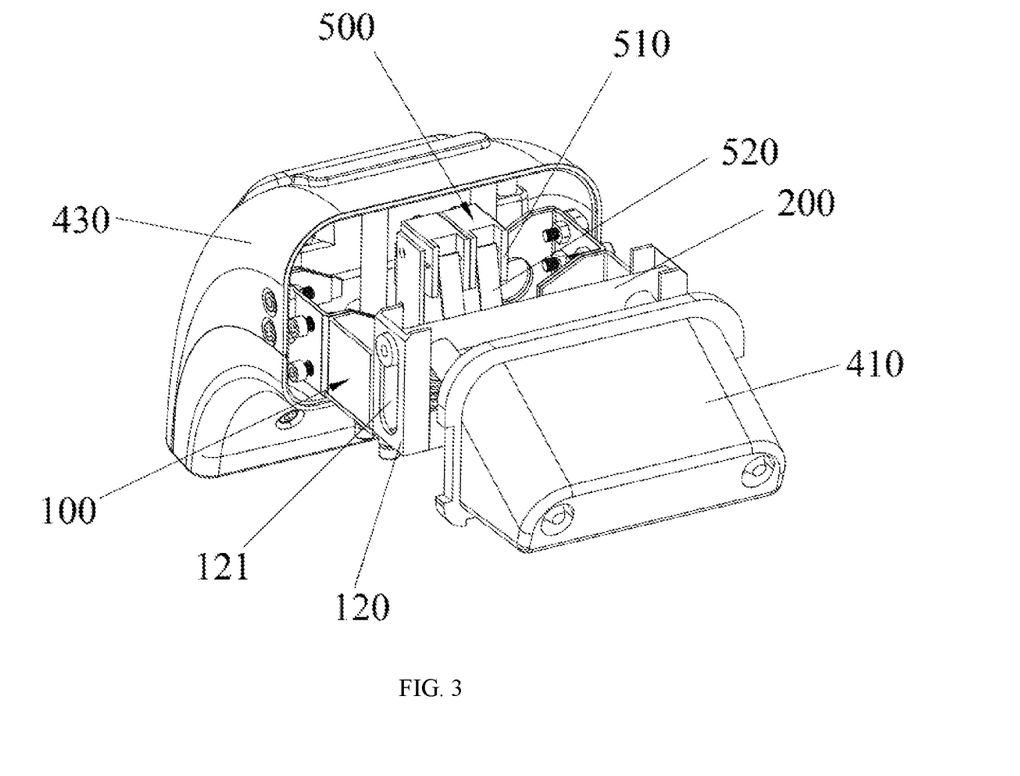
FIG. 3 is a structure diagram according to an embodiment of the present disclosure after removing the second lock rod shroud.
Figure 4:
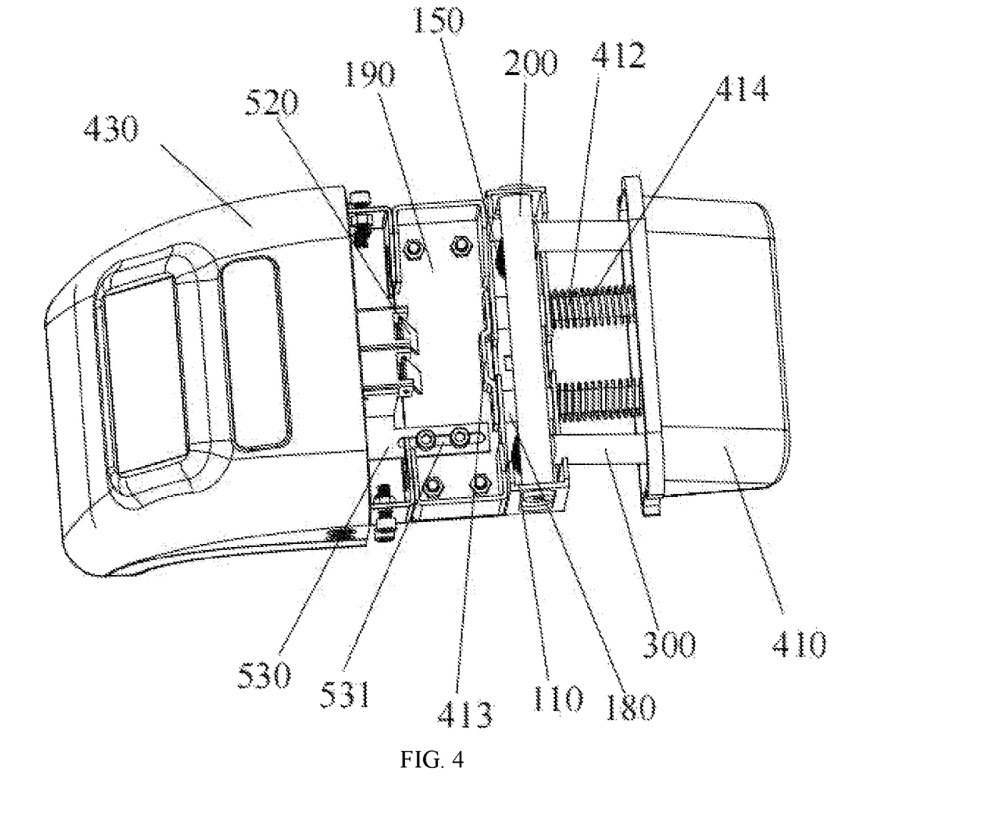
FIG. 4 is a structure diagram of FIG. 3 from another perspective.
Figure 5:
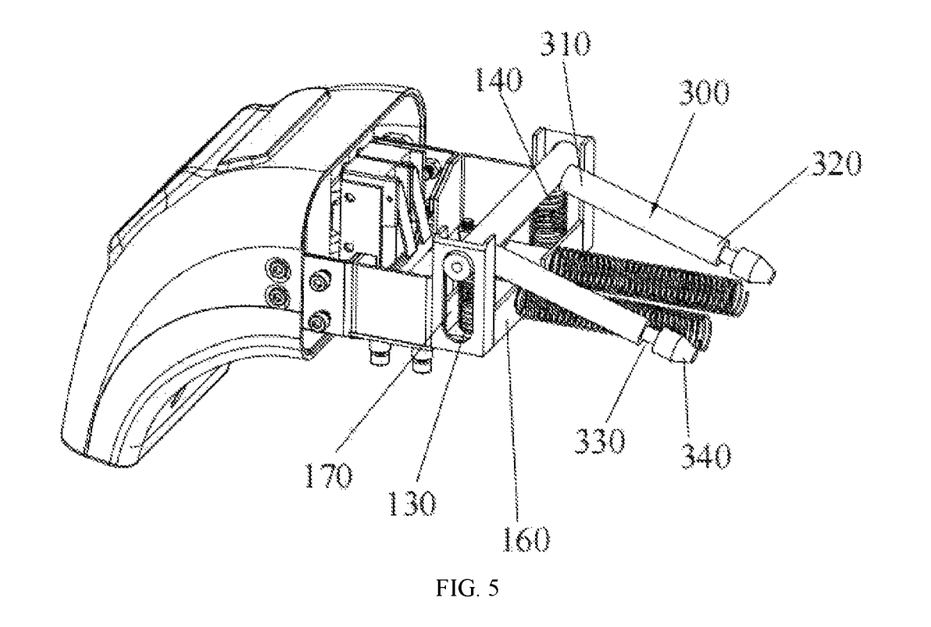
FIG. 5 is a structure diagram according to an embodiment of the present disclosure after removing the first lock rod shroud and the second lock rod shroud.
Figure 6:
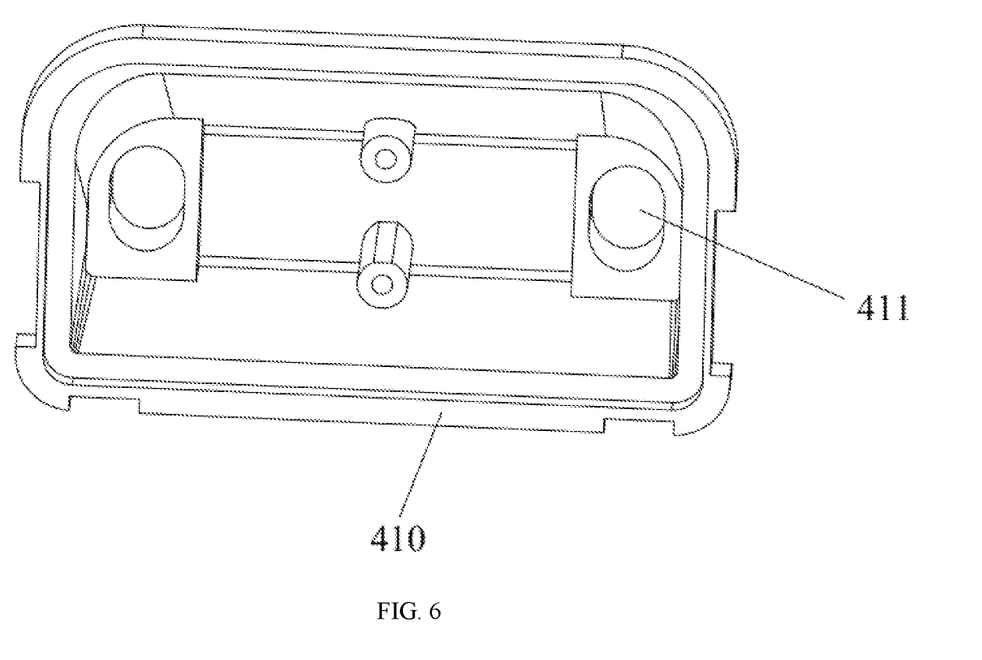
FIG. 6 is a structure diagram of the first lock rod shroud according to an embodiment of the present disclosure.
Figure 7:
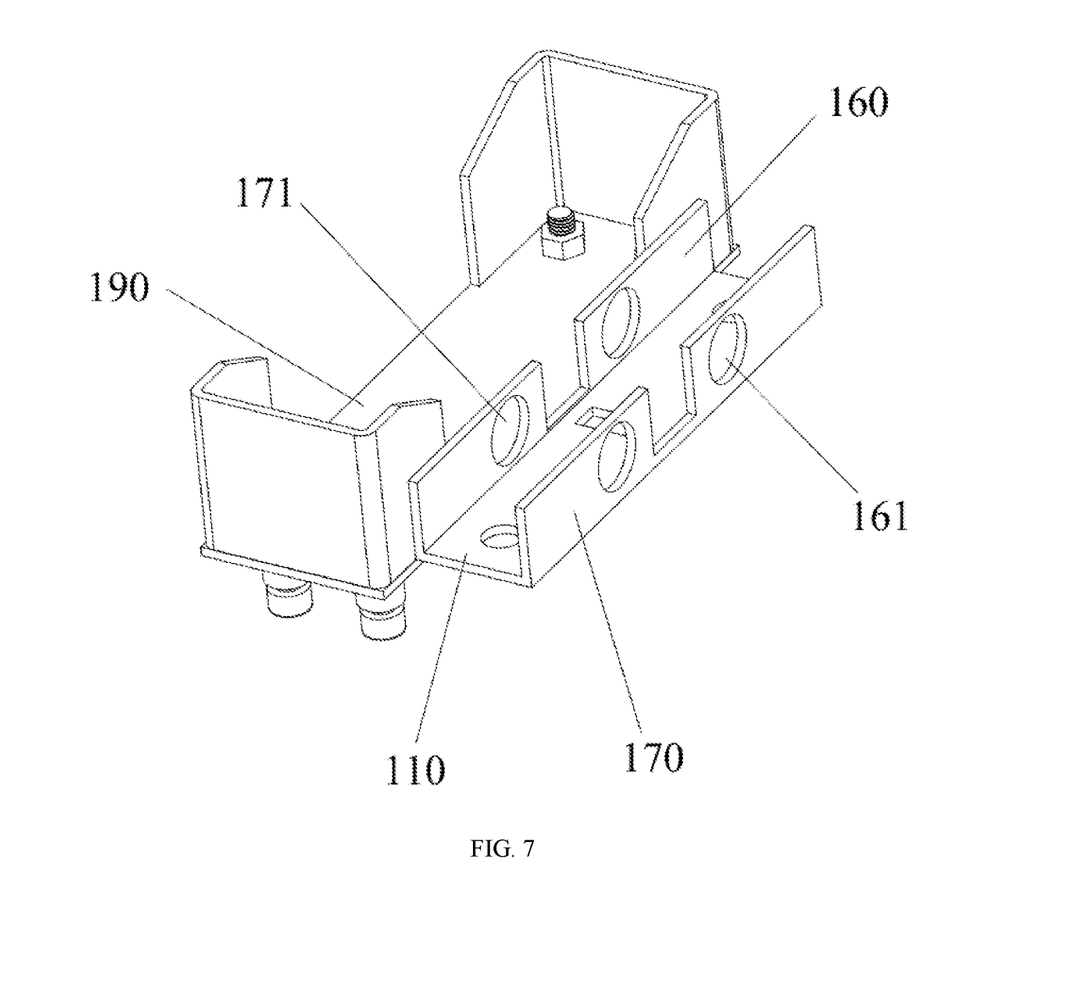
FIG. 7 is a structure diagram of the mounting base according to an embodiment of the present disclosure.

Referring to FIGS. 1-7, a parking lock structure for electric bicycle parking pile in an embodiment of the present disclosure includes a mounting base 100, a movable rod 200, and at least one lock rod 300 extending outward along the width of the mounting base 100.

The mounting base 100 includes a first base plate 110 and two first side plates 120 extending upward from two opposite sides of the first base plate 110. The two first side plates 120 are arranged along the width of the first base plate 110. The middle of each first side plate 120 is provided with a chute 121 extending along the height. The movable rod 200 is transversely arranged above the first base plate 110. Both ends of the movable rod 200 respectively pass through the chutes 121 to limit the reciprocating movement of the movable rod 200 along the height of chute 121.

At least one first guide post 130 is protruded upward on the top surface of the first base plate 110, and a second guide post 140 corresponding to the first guide post 130 is protruded downward on the outer surface of the movable rod 200. A preset spacing distance is reserved between the top surface of the first guide post 130 and the bottom surface of the second guide post 140. There is a first reset spring 150 arranged on the outer surfaces of the first guide post 130 and the second guide post 140. The first reset spring 150 is held between the first base plate 110 and the movable rod 200. The first reset spring 150 arranged on the outer surfaces of the first guide post 130 and the second guide post 140 can enlarge the adjustment range of the lock rod 300 and the application range of the parking lock 10, and make the lock rod 300 automatically return to the initial position. It can be understood that the preset spacing distance can be set according to actual needs, so it can be adaptively set according to the actually needed adjustment range, pressure value of the lock rod 300, and so on.

The lock rod 300 includes a dead lever 310 and a lock lever 320 opposite each other. The dead lever 310 is fixedly connected with the movable rod 200, and a locking groove 330 is defined on the lock lever 320. There is a preset angle of inclination between the axis of the lock lever 320 and the first base plate 110. It should be noted that the lock lever 320 is provided with a locking groove 330 in order to make the lock rod 300 better fit with the external lock body when locking. The shape and size of the locking groove 330 can be set according to actual needs. For example, in an embodiment, the locking groove 330 is an annular groove for 360° locking. The bicycle is locked as long as the external locking body structure is clamped in the locking groove 330, and unlocked as long as the external locking body structure exits the locking groove 330.

In addition, it should be noted that the parking pile 20 generally has a certain height. To make the lock rod 300 more smoothly lock with the external electric bicycle 30, there is a preset angle of inclination between the axis of the lock lever 320 and the first base plate 110. This angle of inclination is matched with the slope of the parking pile 20 to ensure that the lock rod 300 can be smoothly inserted into the lock body structure on the electric bicycle 30 during the feeding process of the electric bicycle 30, thus realizing smooth locking and unlocking. Furthermore, the preset angle of inclination is ranged from 10 to 30°. It is understood that in other embodiments, the preset angle of inclination can be set adaptively according to actual needs and will not be elaborated herein.

As a specific embodiment of the present disclosure, the number of the lock rod 300, first guide post 130 and second guide post 140 is two, and the two lock rods 300, two first guide posts 130 and two second guide posts 140 are arranged at parallel intervals along the length of the movable rod 200.

Furthermore, the lock lever 320 of each lock rod 300 is protruded outward with a leading end 340 in the shape of circular truncated cone. The top diameter of the leading end 340 is smaller than the bottom diameter of that. The leading end 340, with the shape of the circular truncated cone, can better assist the engagement between lock rod 300 and the external lock body.

In an embodiment of the present disclosure, the parking lock 10 structure further includes a lock rod shroud assembly 400. The rod shroud assembly 400 includes a third lock rod shroud 430, a second lock rod shroud 420 configured for covering the mounting base 100 and a first lock rod shroud 410 configured for covering lock rod 300. These lock rod shrouds are connected in sequence. The first lock rod shroud 410 is slidably disposed along the inner wall of the second lock rod shroud 420. The top of first lock rod shroud 410 is provided with two lock holes 411 for the lock rod 300 to penetrate. The inner wall of the first lock rod shroud 410 is protruded with a plurality of push rods 412 facing the second lock rod shroud 420. An electric control device (not shown in the figures) is installed in the cavity of the third lock rod shroud 430.

To further protect and improve the structure of the entire parking lock 10, the structure of the parking lock 10 in the embodiment further includes a first lock rod shroud 410, a second lock rod shroud 420, and a third lock rod shroud 430. These lock rod shrouds are connected in sequence. By arranging the first lock rod shroud 410 slidably along the inner wall of the second lock rod shroud 420, in other words, when pushed by an external thrust, the first lock rod shroud 410 slides along the inner wall of the second lock rod shroud 420. In this way, the lock rod 300 extends out along the position of the lock hole 411 to lock the electric bicycle 30. When the bicycle needs to be unlocked, the first lock rod shroud 410 can slide out along the inner wall of the second lock rod shroud 420 under the action of the first reset spring 150, thus the lock rod 300 can be covered again. This structure is ingenious and can protect the lock lever 300 effectively.

In addition, the cavity of the third lock rod shroud 430 can be equipped with the electric control device, including but not limited to an indicator light module, a solar energy module, or communication module, etc. It may assist a travel switch assembly 500 to realize intelligent control over the parking lock 10, so as to improve the humanized and intelligent level of the parking pile 20.

In an embodiment of the present disclosure, the mounting base 100 further includes a second side plate 160 and a third side plate 170 opposite each other. The second side plate 160 is near the lock lever 320, and the third side plate 170 is far away from the lock lever 320. The second side plate 160 and the third side plate 170 are both arranged along the length of the first base plate 110. The second side plate 160 is provided with a plurality of first through holes 161 arranged at intervals along the length of the first base plate 110. The third side plate 170 is provided with a plurality of second through holes 171 one-to-one corresponding to the first through holes 161. A fixed sleeve 180 is installed between each first through hole 161 and the corresponding second through hole 171, and a push part 413 is connected with the free ends of the push rods 412. By installing the fixed sleeve 180 between the first through hole 161 and the second through hole 171, the push rod 412 can be driven to slide along the fixed sleeve 180 by the push of the first lock rod shroud 410. In this way, the push part 413 is driven to touch the travel switch 520, thereby realizing intelligent control of the parking lock 10.

Furthermore, the outer surface of each push rod 412 is further equipped with a second reset spring 414. Both ends of the second reset spring 414 are respectively abutted against a second side plate 160 and the inner wall of the first lock rod shroud 410. The second reset spring 414 provided on the outer surface of the push rod 412 can further assist the first reset spring 150 to complete the automatic return of the first lock rod shroud 410, the lock lever 300 and the push part 413.

In another embodiment of the present disclosure, the mounting base 100 further includes a second base plate 190 arranged side by side with the first base plate 110, and a travel switch assembly 500 is arranged on the second base plate 190. Specifically, the travel switch assembly 500 includes a travel switch body 510, and at least one travel switch 520 which can swing around the travel switch body 510. The travel switch body 510 is fixedly connected with the second base plate 190. The travel switch 520 is set on the side of the second base plate 190 far away from the push part 413. A first preset distance is spaced between the bottom surface of the travel switch 520 and the second base plate 190, and a second preset distance is spaced between the travel switch 520 and the second side plate 190. The first preset distance is less than the height of the push part 413, and the second preset distance is less than the difference between the length of the push rod 412 and the length of the fixed sleeve 180.

In particular, the travel switch assembly 500 is configured to trigger the electric control device installed in the cavity of the third lock rod shroud 430. When the lock rod shroud assembly 400 is pushed and pulled, the push rod 412 reciprocates within the fixed sleeve 180 to turn on and turn off the travel switch 520 by sliding the push rod 412 within the fixed sleeve 180. For example, after the electric bicycle 30 is pushed into the parking pile 20, the first lock rod shroud 410 is driven back, and the push rod 412 is driven to slide along the fixed sleeve 180, so as to drive the push part 413 to move toward the push part 413. When the electric bicycle 30 is pushed to a proper distance (for example, after the push part 413 touches the travel switch 520), the travel switch body 510 gives a prompt of successful locking, or sends control instructions to other control modules, such as controlling the indicator light to display different colors and controlling the electric control device to connect with an external power supply to charge the electric bicycle 30. The specific instructions can be set according to actual needs. In this way, it will improve the intelligent and humanized control over the whole parking pile 20 and enhance the unlocking and locking efficiency of the electric bicycle 30.

It should be understood by those skilled in the art that the first preset distance is set to be less than the height of the push part 413 to ensure that the push part 413 can touch the travel switch 520, thereby realizing intelligent control. The second preset distance is set to be less than the difference between the length of the push rod 412 and the length of the fixed sleeve 180 to ensure that the push rod 412 has sufficient stroke to push the push part 413, thereby triggering the travel switch 520.

Furthermore, the parking lock 10 further includes an L-shaped connecting base plate 530. The connecting base plate 530 is provided with a third through hole 531 in a slender shape and is connected with the second base plate 190 by screws passing through the third through hole 531. By installing the L-shaped connecting base plate 530 and drilling the third through hole 531 in the slender shape on the connecting base plate 530, the position of the travel switch body 510 can be adjusted, and the accuracy and the application range of the parking lock 10 can be further increased. In addition, screw connection is adopted to facilitate installation and disassembly.

The present disclosure also provides an electric bicycle parking pile, which includes a parking pile body and parking lock 10 structure as described above. With the parking lock 10 structure, the application range of the parking pile 20 can be increased, and the intelligent and humanized level of the parking pile 20 can also be improved.

The present disclosure provides an electric bicycle parking pile and a parking lock structure thereof. The parking lock structure includes the mounting base, the movable rod and at least one lock rod extending outward along the width of the mounting base. The mounting base includes a first base plate and two first side plates extending upward from two opposite sides of the first base plate. The middle of each first side plate is provided with a chute extending along the height. The first reset spring on the outer surfaces of the first guide post and the second guide post can enlarge the adjustment range of the lock rod and the application range of parking lock, and make the lock rod automatically return to the initial position. The lock lever is provided with a locking groove to make the lock rod better fit with the external lock body when locking. There is a preset angle of inclination between the axis of lock lever and the first base plate. In this way, the lock rod can be smoothly inserted into the lock body structure on the electric bicycle during the feeding process of bicycle, so as to realize the smooth locking and unlocking. In addition, the second reset spring on the outer surface of the push rod can further assist the first reset spring to complete the automatic return of the first lock rod shroud, the lock rod and the push part. In this way, it will improve the intelligent and humanized control over the whole parking pile and enhance the unlocking and locking efficiency of electric bicycle.

The above are preferred embodiments of the present disclosure only and do not therefore limit the scope of the present disclosure. Any equivalent structure or equivalent process transformation made by using the contents of this specification and drawings, or directly or indirectly applied to other related technical fields, are similarly included in the patent protection scope of the present disclosure.

What is claimed is:

1. A parking lock structure for an electric bicycle parking pile, comprising a mounting base, a movable rod, and at least one lock rod extending outward along the width of the mounting base,
   wherein the mounting base comprises a first base plate and two first side plates extending upward from two opposite sides of the first base plate, the two first side plates are arranged along the width of the first base plate; the middle of each first side plate is provided with a chute extending along the height; the movable rod is transversely set above the first base plate, and both ends of the movable rod respectively pass through the chute to limit a reciprocating movement of the movable rod along the height of the chute;
   at least one first guide post is protruded upward on a top surface of the first base plate, and at least one second guide post corresponding to the at least one first guide post is protruded downward on an outer surface of the movable rod, a preset spacing distance is reserved between a top surface of the at least one first guide post and a bottom surface of the at least one second guide post, wherein, there is a first reset spring on an outer surface of the at least one first guide post and the at least one second guide post, the first reset spring being held between the first base plate and the movable rod;
   wherein the at least one lock rod comprises a dead lever and a lock lever opposite each other, the dead lever is fixedly connected with the movable rod, and a locking groove is defined on the lock lever; and there is a preset angle of inclination between the axis of the lock lever and the first base plate;
   wherein the parking lock structure further comprises a lock rod shroud assembly, the lock rod shroud assembly comprises a third lock rod shroud, a second lock rod shroud configured for covering the mounting base and a first lock rod shroud configured for covering the lock rod, these lock rod shrouds are connected in sequence, wherein the first lock rod shroud is capable of sliding along an inner wall of the second lock rod shroud, the top of the first lock rod shroud is provided with two lock holes for the lock rod to penetrate, an inner wall of the first lock rod shroud is protruded with a plurality of push rods facing the second lock rod shroud, an electric control device is installed in a cavity of the third lock rod shroud;
   wherein the mounting base further comprises a second side plate and a third side plate opposite each other, wherein the second side plate is near the lock lever, and the third side plate is further away from the lock lever that the second side plate, the second side plate and the third side plate are both arranged along the length of the first base plate; the second side plate comprises a plurality of first through holes arranged at intervals along the length of the first base plate, the third side plate comprises a plurality of second through holes in a one-to-one corresponding number to the first through holes, a fixed sleeve is installed between a first through hole and a second through hole, and a push part is connected with a free end of the push rod;

wherein the mounting base further comprises a second base plate arranged side by side with the first base plate, and a travel switch assembly is arranged on the second base plate, wherein the travel switch assembly comprises a travel switch body, and at least one travel switch which is configured to swing around the travel switch body; wherein the travel switch body is fixedly connected with the second base plate, the travel switch is arranged on the side of the second base plate opposite from the push part, a first preset distance is spaced between a bottom surface of the travel switch and the second base plate, and a second preset distance is spaced between the travel switch and the second side plate; wherein the first preset distance is less than a height of the push part, and the second preset distance is less than a difference between a length of the push rod and a length of the fixed sleeve; and wherein the travel switch assembly further comprises an L-shaped connecting base plate, wherein the connecting base plate is provided with a third through hole in a slender shape and is connected with the second base plate through screws passing through the third through hole.

2. The parking lock structure according to claim 1, wherein the number of the lock rod, the first guide post and the second guide post is two, the two lock rods, two first guide posts and two second guide posts are arranged at parallel intervals along the length of the movable rod.

3. The parking lock structure according to claim 1, wherein the lock lever of each lock rod is protruded outward with a leading end in a shape of circular truncated cone, a top diameter of the leading end is smaller than a bottom diameter thereof.

4. The parking lock structure according to claim 1, wherein the preset angle of inclination is between 10° and 30°.

5. The parking lock structure according to claim 1, wherein an outer surface of the push rod is further equipped with a second reset spring, both ends of the second reset spring are respectively abutted against the second side plate and the inner wall of the first lock rod shroud.

6. An electric bicycle parking pile, comprising a parking pile body and a parking lock structure according to claim 1.

* * * * *